United States Patent [19]
Salamat et al.

[11] Patent Number: 5,777,218
[45] Date of Patent: Jul. 7, 1998

[54] MONITOR FOR UNCOMMANDED BRAKING

[75] Inventors: Bijan Salamat, Santa Clarita; Robert D. Cook, Valencia; Raymond Kwong, West Covina, all of Calif.

[73] Assignee: Hydro-Aire Division of Crane Company, Burbank, Calif.

[21] Appl. No.: 615,856

[22] Filed: Mar. 12, 1996

[51] Int. Cl.$^6$ .................. B60Q 1/00; G01L 5/28
[52] U.S. Cl. .............. 73/121; 73/129; 73/132; 340/453
[58] Field of Search ............... 73/121, 123, 126, 73/129, 118.1, 132; 340/453, 454

[56] References Cited

U.S. PATENT DOCUMENTS

| | | | |
|---|---|---|---|
| 2,409,467 | 10/1946 | Bock | 73/126 |
| 3,602,042 | 8/1971 | Mitchell | 73/126 |
| 4,771,387 | 9/1988 | Hexel et al. | 73/121 |
| 4,824,182 | 4/1989 | Steffes et al. | 73/121 |
| 5,003,818 | 4/1991 | Hoodenpyle et al. | 73/121 |
| 5,051,578 | 9/1991 | Slemon et al. | 250/227.23 |
| 5,204,619 | 4/1993 | Beigbeder et al. | 324/174 |
| 5,378,052 | 1/1995 | Yoshino | 340/453 |
| 5,390,990 | 2/1995 | Cook et al. | 303/93 |
| 5,394,137 | 2/1995 | Orschek | 340/453 |
| 5,507,568 | 4/1996 | Cook et al. | 303/135 |
| 5,535,622 | 7/1996 | Walter | 73/121 |

*Primary Examiner*—George M. Dombroske
*Attorney, Agent, or Firm*—Fulwider, Patton Lee & Utecht, LLP

[57] ABSTRACT

The monitor for uncommanded braking controls uncommanded brake application on one or more wheels during takeoff of an aircraft. Brake pedal application is determined, brake pressure is measured, and brake pressure is compared with a selected threshold brake pressure. A brake pressure applied signal is generated when the brake pressure exceeds the threshold brake pressure. The pedal application signal and brake pressure applied signal are received by a fault latch logic circuit that generates a fault latch output signal when uncommanded braking has occurred. A test inhibit signal is also generated when weight is not applied on the wheel. The test inhibit signal is also input to the fault latch logic circuit so that uncommanded braking can occur when the aircraft is in the air and weight is off the wheel. The monitor disables or latches off the shutoff valve when pressure is detected without pedal application. A fail-safe feature re-enables the shutoff valve to allow it to turn on, and monitoring is stopped, when pedal application is detected.

3 Claims, 1 Drawing Sheet

MONITOR FOR UNCOMMANDED BRAKING

BACKGROUND OF THE INVENTION

1. Field of the Invention

This invention relates generally to deceleration control systems for vehicles, and more particularly concerns a monitor for controlling uncommanded braking of one or more wheels of an aircraft during takeoff that also permits the use of a single microproprocessor to perform all brake control functions.

2. Description of Related Art

Automatic braking systems have been commonly provided on commercial aircraft to aid the deceleration of the aircraft upon landing. As the size and complexity of aircraft have increased, the automatic braking systems have also become more complex and computerized. Modern anti-skid systems incorporated into aircraft braking systems commonly optimize braking efficiency by adapting to runway conditions and other factors which affect braking in order to optimize deceleration, typically corresponding to the level of brake pressure selected by the pilot.

A catastrophic failure mode has been identified in one such conventional single microproprocessor controlled brake-by-wire control system that results in uncommanded brake application on one or more wheels during takeoff of the aircraft. Since uncommanded braking during takeoff can have serious consequences, and at the very least can result in unnecessary and accelerated wear to the braking system, it is desirable to configure the braking system to reduce the possibility of these undesirable results. Conventional brake control systems having this type of catastrophic failure mode typically require a second channel for monitoring and backup of the brake control system to prevent uncommanded braking.

One conventional approach to overcoming the failure of the control system has been the implementation of a multiple processor microcontroller design utilizing D0178A level 1 or D0178B level A software. However, the costs of implementing a multiple microprocessor controller design are significantly greater than that for a control system utilizing a single microprocessor. It is highly desirable to provide a monitor for uncommanded braking to prevent uncommanded braking during takeoff of an aircraft. It would also be desirable to provide such a monitor for uncommanded braking that is implemented in hardware rather than in software with multiple processors. The present invention meets these needs.

SUMMARY OF THE INVENTION

Briefly, and in general terms, the present invention provides for a new and improved monitor for uncommanded braking that also permits the use of a single micropropro-cessor controlled brake-by-wire control system for control of uncommanded brake application on one or more wheels during takeoff of an aircraft. The control system of the invention for uncommanded braking solves the problem of the catastrophic failure mode, so that a single microprocessor or microcontroller can be utilized to perform all brake control functions. The hardware monitor is easily adaptable to most brake-by-wire designs. The costs of implementing the hardware monitor are tremendously less than that for a control system utilizing dual microprocessors.

The monitor circuitry is implemented totally with hardware, using the same inputs as are used by the brake system microcontroller, and does not rely on software to function. The hardware monitor disables or latches off the shutoff valve when pressure is detected without pedal application. A fail-safe feature re-enables the shutoff valve to allow it to turn on, and monitoring is stopped, when pedal application is detected.

The present invention provides for an apparatus for monitoring uncommanded braking for a vehicle having at least one wheel and a wheel braking system with an operator operated brake pedal or the like for controlling braking pressure. The wheel braking system also includes a shut off valve that can be activated to prevent braking. The apparatus for monitoring uncommanded braking comprises means for determining brake pedal application and for generating a pedal application signal indicating whether a brake pedal has been applied, means for measuring brake pressure, and means for comparing the brake pressure with a selected threshold brake pressure. The means for comparing the brake pressure with the threshold generates a brake pressure applied signal when the brake pressure exceeds the threshold brake pressure. The pedal application signal and brake pressure applied signal are received by a fault latch logic circuit that generates a fault latch output signal when uncommanded braking has occurred. Those skilled in the art will recognize that, while the invention is discussed in the context of a brake pedal of the type used in an aircraft, the system may be used with any actuation apparatus designed to command braking of a vehicle.

In a presently preferred embodiment, means are provided for sensing weight on the wheel and for generating a test inhibit signal when weight is not applied on the wheel. The test inhibit signal is also input to the fault latch logic circuit so that uncommanded braking can occur when the aircraft is in the air and weight is off the wheel. In a presently preferred embodiment, means are provided for testing functionality of the apparatus for monitoring uncommanded braking and for generating a test enable signal that is received by the fault latch logic circuit for resetting the fault latch to allow testing of the monitor apparatus with a test pressure pulse. Control means are preferably also provided for generating a shut off valve control signal, which is also received by the fault latch logic circuit. In a currently preferred embodiment, means are provided for generating a shut off command signal to the shut off valve that is generated only if the fault latch logic circuit generates an output fault latch signal and the control means generates the shut off valve control signal.

These and other aspects and advantages of the invention will become apparent from the following detailed description, and the accompanying drawing, which illustrate by way of example the features of the invention.

DETAILED DESCRIPTION OF A PREFERRED EMBODIMENT

Figure 1:
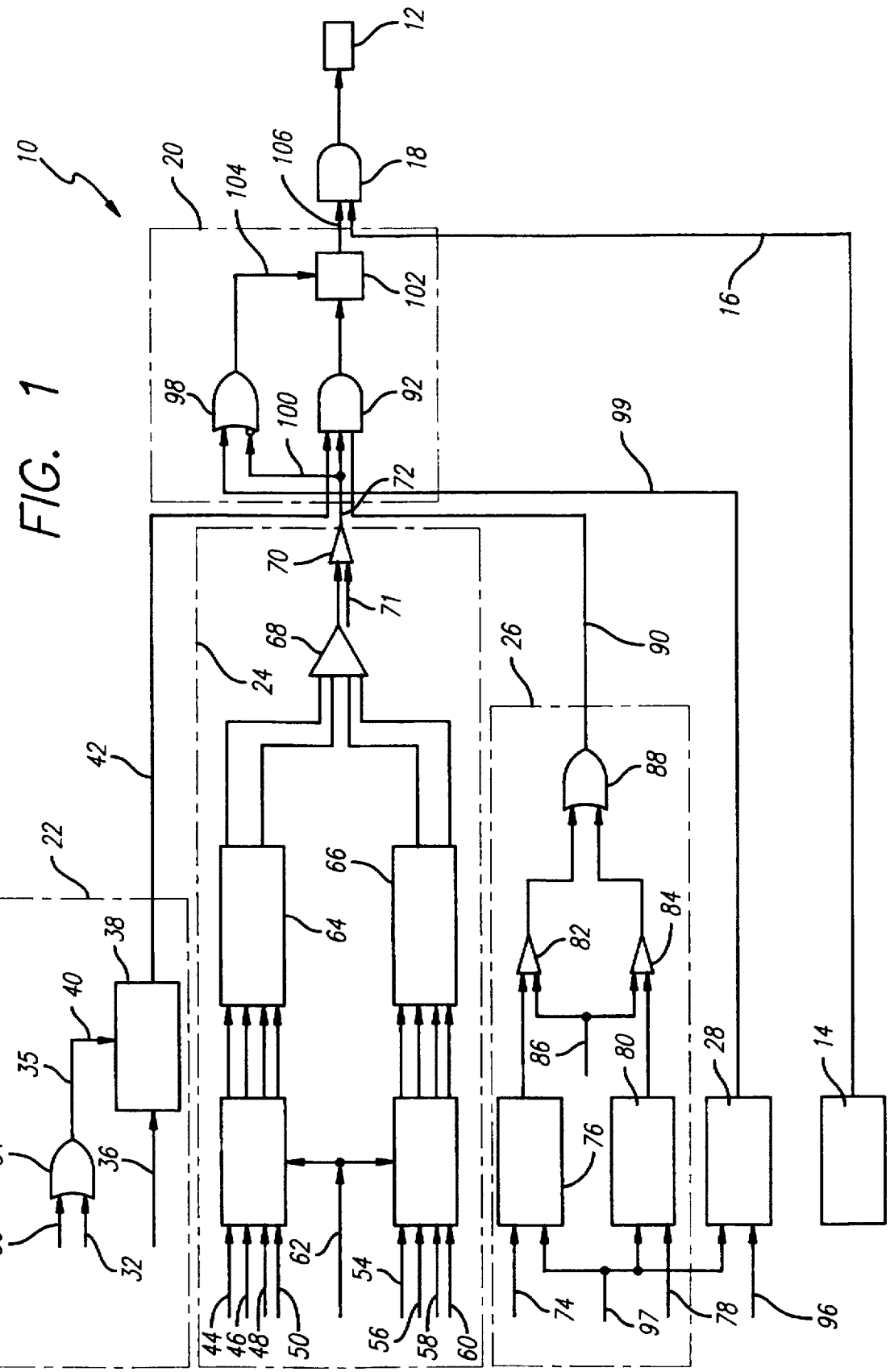
FIG. 1 is a schematic diagram of the monitor for uncommanded braking according to the principles of the invention.

A potential catastrophic failure mode has been identified in a single microprocessor controlled aircraft brake-by-wire control system that results in uncommanded braking during takeoff. While implementation of a software controlled multiple processor microcontroller can be used to overcome the problem, the costs and complexity of doing so are significantly greater than for implementation of a single microprocessor microcontroller with a monitor for uncommanded braking implemented in hardware.

As is illustrated in FIG. 1, the invention is embodied in a monitor for uncommanded braking 10 in a braking system for a vehicle, such as in braking system including a brake-by-wire control system for an aircraft. The braking system preferably includes a shut off valve 12 that can be activated to prevent braking. The braking system typically is controlled by a conventional braking microprocessor unit or microcontroller 14 utilizing D0178A level 2 or D0178B level B software to perform all normal brake control functions, and to provide a shut off valve control signal 16 when the microcontroller function is selected to prevent braking. The shut off valve control signal is received by a fault latch output AND gate 18, which also receives a fault latch output signal from the fault latch logic circuit 20 when uncommanded braking has been detected. In order for the shut off valve to turn on, both the shut off control signal from the microcontroller and the fault latch output signal from the fault latch logic circuit must be received by the fault latch logical AND gate.

The monitor for uncommanded braking provides inputs to the fault latch logic circuit for determination of a condition of undesirable uncommanded braking. A gear test inhibit logic circuit 22 is provided to generate a test inhibit signal that is used to inhibit the hardware monitor in certain conditions. A pedal application circuit 24 is provided for determining whether brake pedal application has occurred. A brake pressure circuit 26 tests the left and right wheel brake pressures for a minimum threshold, and a built-in-test enable logic circuit 28 tests the functionality of the monitor for uncommanded braking.

In a currently preferred embodiment, the gear test inhibit logic circuit 22 is provided to generate a test inhibit signal that is used to inhibit the hardware monitor for uncommanded braking when the aircraft is in "AIR" mode, i.e. when the aircraft wheels are no longer touching the ground, when the gear handle is up and weight is off the wheels. Uncommanded braking that is not pilot or copilot generated can properly occur in this situation, during which time the hardware monitor would need to be inhibited. When the gear is retracted, an application of braking pressure is typically performed at 200 psi for 4 seconds while weight is off the wheel, and the gear handle transitions to "AIR" mode. Also, in gear extension testing, a pressure pulse test, braking commands of 600 psi are delivered to the left and right brakes sequentially. This test occurs after a gear extension sequence, and the shut off valve would turn on when the gear handle transitions to a down position, and the "AIR" mode is off. When the gear handle transitions to down, a tuneable timer set to typically 5 seconds, for example, is started. After the timer expires, the hardware monitor is enabled to monitor again.

In order to avoid single point failure from stopping the hardware monitor from operating, such as from a failed gear handle switch, weight on wheel sensors, such as left weight on wheel switch 30 and right weight on wheel switch 32, are used as a backup means for enabling the hardware monitor. The output signals from the weight on wheel switches are received by OR gate 34, which operates to output a weight on wheel signal 35 if weight is detected on any wheel. A gear handle position switch 36 also is provided to generate a gear handle up signal if the gear handle is in the "AIR" position. The gear test inhibit logic circuit 38 receives the gear handle up signal, and receives the weight on wheel signal as a reset input 40. When weight on a wheel is detected, a tuneable timer (not shown) is started that is set to a desired delay period, typically approximately 8 seconds, for example. After the timer expires, the hardware monitor is enabled to monitor again.

The gear test inhibit logic circuit generates a gear test inhibit signal 42 provided as an input to the fault latch logic circuit. The logic for providing the gear test inhibit signal is as follows:

Test Enable=Gear handle down+gear handle delay
Test Enable=Weight on wheel+weight-on-wheel delay
Test Inhibit=Gear handle up and weight off wheels The monitor for uncommanded braking preferably also includes a pedal application circuit 24. Pedal position for the right and left brake pedals is measured with a sensor, such as a linear variable-differential transformer (LVDT) having an armature connected to the pedal that moves linearly inside first (HI) and second (LO) coils, so that movement of the armature inside the coils of the differential transformer changes the inductances of the coils. Pedal position can thus be obtained by determining the difference between the LVDT coil A (HI) and LVDT coil A (LO) signals.

Position=LVDT coil (HI)−LVDT coil (LO)

A test LVDT signal is determined by summing the LVDT coil A (HI) and LVDT coil A (LO) signals.

Test=LVDT coil (HI)+LVDT coil (LO)

With reference to FIG. 1, the position of the pilot's left brake pedal is thus provided by the pilot left LVDT coil A (HI) 44 and the pilot left LVDT coil A (LO) 46, while the position of the pilot's right brake pedal is provided by the pilot right LVDT coil B (HI) 48 and the pilot right LVDT coil B (LO) 50. Similarly, the position of the copilot's left brake pedal is thus provided by the copilot left LVDT coil A (HI) 54 and the copilot left LVDT coil A (LO) 56, while the position of the pilot's right brake pedal is provided by the copilot right LVDT coil B (HI) 58 and the copilot right LVDT coil B (LO) 60.

A Pilot/Copilot select signal 62 can be used by the monitor circuit to select between demodulation of the pilot and copilot pedal position and test signals. The signals from the pilot left and right LVDT coils are received by the pilot pedal position and test signal circuit 64, while the signals from the copilot left and right LVDT coils are received by the copilot pedal position and test signal circuit 66. The pilot and copilot pedal position and test signal circuits provide outputs of the left and right pilot and copilot pedal positions, respectively, to the pedal position comparator circuit 68, which selects the highest of the pilot and copilot LVDT values, which is in turn output to the pedal applied comparator circuit 70. The highest of the pilot and copilot left pedal position LVDT values is selected to determine the left pedal position, and the highest of the pilot and copilot right pedal position LVDT values is selected to determine the right pedal position. The determination of whether a pedal has been applied is made by the pedal applied comparator circuit 70, by comparing pedal position values with a threshold value 71, which is typically set to a value that is approximately 5% of the maximum pedal position value, although other similar threshold values may also be suitable. When a pedal is determined to have been applied, a pedal applied signal 72 is provided by the pedal applied comparator circuit as one input to a fault latch logic circuit. The test signals are used to check each pedal LVDT for integrity, by checking the minimum and maximum limits of the test signals. If the test signal falls outside predefined limits, then demodulation of the particular pedal LVDT is discontinued, and the pedal position is zeroed.

The hardware monitor also preferably includes a brake pressure circuit 26 that tests the left and right wheel brake pressures for a minimum threshold. The brake pressure circuit includes a left brake pressure detector 74 whose signal output is received by a signal filter 76 for filtering spurious pressure spikes, and a right brake pressure detector 78 whose output is received by a signal filter 80. The filtered pressure signals from the left and right brakes are received by pressure signal comparators 82 and 84, respectively, for comparison with a selected minimum threshold value from reference pressure signal source 86. The outputs of the pressure signal comparators is received by OR gate 88, such that a pressure detection signal 90 is generated if either the left or right brake pressure is greater than the selected minimum threshold, which is typically about 300 psi, for example, although other similar threshold values may be suitable. The test inhibit signal, the pedal applied signal, and the pressure detection signal are provided inputs to the fault latch AND gate 92 of the fault latch logic circuit.

The fault latch logic latches an uncommanded pressure condition. Uncommanded pressure is determined by a logical AND of the pedal released signal, pressure detection signal, and test enable signals input to the fault latch logic circuit, requiring all three input signals to result in a fault latch, as follows:

Fault Latch=Pedal Released+Pressure Detected+Test Enable

A latched fault can be reset by brake pedal application, or by a hardware monitor built-in test sequence, which is a fail-safe feature explained further below, built into the circuitry that can reset the fault latch, stop the operation of the monitor, and allow the shut off valve to turn on.

The functionality of the hardware monitor is tested at power-up by a built-in test enable circuit 28 at a safe time to do so, such as when there is no wheel speed and no reference velocity present. A hybrid LVDT is set to loopback to provide an LVDT loopback input signal 96 to the built-in test enable circuit. A simulated brake pressure test pulse 97 is also generated and input to the right and left brake pressure filters and to the built-in test enable circuit. The built-in test enable circuit in response produces a test enable signal 99 to the fault latch OR gate 98, which also receives the pedal position input 100. The output of the fault latch AND gate 92 of the fault latch logic circuit is received by the fault latch 102, which can be reset by input from the fault latch OR gate 98 to the fault latch reset 104. The fault latch output 106 of the fault latch 102 is received by the fault latch output AND gate 18, which in turn produces the shut off valve command signal.

The built-in-test sequence of the monitor for uncontrolled braking has the following logic:

1. Ensure no pedal application (i.e., be in monitor mode).
2. Apply a simulated pressure test pulse to simulate uncommanded pressure.
3. Verify that the shut off valve is turned off.
4. Reset the fault latch, and allow the shut off valve to turn on.

In order to insure that there is no pedal application, the pedal fault detection circuitry is used to ensure that the pedals are released. The logic is as follows:

1. Set the LVDT circuitry in loopback mode.
2. Pedal LVDT fault is detected by the hardware monitor.
3. Pedal demodulation is stopped by the hardware monitor.
4. Sample and hold capacitors are discharged and zero pedal position is achieved.
5. The hardware monitor is set to Pedal Released mode.

After the Pedal Released condition is detected at test point A (not shown), the simulated pressure pulse is injected. The shut off valve will turn off in a predetermined period of time, such as 200 ms, for example. When the shutoff valve is determined to be off, the pressure test pulse is removed. The LVDT hybrid is then taken out of loopback mode where the same sequence will reset the fault latch. The reset signal to the fault latch is capacitive coupled to avoid failures keeping the output stage (fault latch) in reset condition. If the hardware monitor built-in-test logic fails, and tries to reset the fault latch continuously, the capacitive coupling only allows a momentary pulse, thereby avoiding a continuous reset condition.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. Apparatus for monitoring uncommanded braking for a vehicle having a wheel and a hydraulically operated wheel braking system with a brake pedal for controlling operation of said wheel braking system and a shut off valve for preventing communication of brake pressure to prevent braking by said wheel braking system, comprising:

means for determining brake pedal application and for generating a pedal application signal indicating whether said brake pedal has been applied;

means for measuring brake pressure;

means for comparing said brake pressure with a selected threshold brake pressure and for generating a brake pressure signal when said brake pressure exceeds said threshold brake pressure;

fault latch means for receiving said pedal application signal and said brake pressure signal, and for generating a fault latch output signal for controlling said shut off valve responsive to said pedal application signal and said brake pressure signal; and means for sensing weight on said wheel and for generating a test inhibit signal when weight is not applied on said wheel.

2. Apparatus for monitoring uncommanded braking for a vehicle having a wheel and a hydraulically operated wheel braking system with a brake pedal for controlling operation of said wheel braking system and a shut off valve for preventing communication of brake pressure to prevent braking by said wheel braking system, comprising:

means for determining brake pedal application and for generating a pedal application signal indicating whether said brake pedal has been applied;

means for measuring brake pressure;

means for comparing said brake pressure with a selected threshold brake pressure and for generating a brake pressure signal when said brake pressure exceeds said threshold brake pressure;

control means for generating a shut off valve control signal;

fault latch means for receiving said pedal application signal and said brake pressure signal, and for generating a fault latch output signal for controlling said shut off valve responsive to said pedal application signal and said brake pressure signal;

means for generating a shut off command signal to said shut off valve responsive to said shut off valve control signal and said fault latch output signal; and means for sensing weight on said wheel and for generating a test inhibit signal when weight is not applied on said wheel.

3. A method for monitoring uncommanded braking for a vehicle having a wheel and a hydraulically operated wheel braking system with a brake pedal for controlling operation of said wheel braking system and a shut off valve for preventing communication of brake pressure to prevent braking by said wheel braking system, the steps of the method comprising:

determining brake pedal application and generating a pedal application signal indicating whether said brake pedal has been applied;

measuring brake pressure;

comparing said brake pressure with a selected threshold brake pressure and generating a brake pressure signal when said brake pressure exceeds said threshold brake pressure;

generating a fault latch output signal for controlling said shut off valve responsive to said pedal application signal and said brake pressure signal;

sensing weight on said wheel; and generating a test inhibit signal when weight is not applied on said wheel.

* * * * *